(No Model.)

O. W. KELLY & L. F. DIETER.
TRACTION WHEEL.

No. 336,649. Patented Feb. 23, 1886.

Attest:
Willis Baines
G. C. Bowlus

Inventors:
Oliver W. Kelly
and Louis F. Dieter
By Paul A. Staley
Atty

United States Patent Office.

OLIVER W. KELLY AND LOUIS F. DIETER, OF SPRINGFIELD, OHIO, ASSIGNORS TO THE SPRINGFIELD ENGINE AND THRESHER COMPANY, OF SAME PLACE.

TRACTION-WHEEL.

SPECIFICATION forming part of Letters Patent No. 336,649, dated February 23, 1886.

Application filed September 1, 1885. Serial No. 175,931. (No model.)

*To all whom it may concern:*

Be it known that we, OLIVER W. KELLY and LOUIS F. DIETER, citizens of the United States, residing at Springfield, in the county of Clark and State of Ohio, have invented certain new and useful Improvements in Sectional Traction-Wheels, of which the following is a specification.

Our invention relates to traction-wheels; and the object of our invention is to provide a traction-wheel particularly adapted for traction-engines, which shall be light, strong, and economical in construction.

In the wheels most commonly used on traction engines the rim or tire is made of wrought-iron, with cleats or lugs thereon to prevent slipping. These cleats or lugs are rolled on the tire integral therewith, and at the points where the cleats occur there is a superabundance of metal, which renders the wheel exceedingly heavy without greatly increasing the strength. Another trouble experienced with wheels of this class is the difficulty of obtaining tires beyond certain width, owing to the difficulty in rolling, while cases frequently occur where it is desirable to have them of greater width. We overcome these difficulties by providing a wheel made in sections, preferably of malleable iron, the cleats or lugs being formed integral therewith and cupped or cored out, so that the thickness of metal is uniform throughout the length and breadth of the tire.

Our invention consists in the constructions and combinations hereinafter described and claimed.

Figure 2:
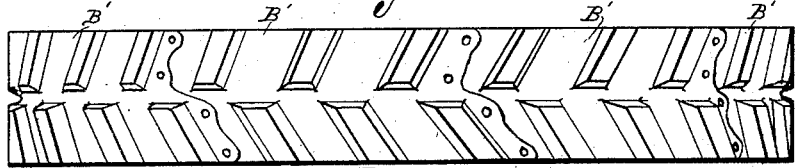
Figure 1:
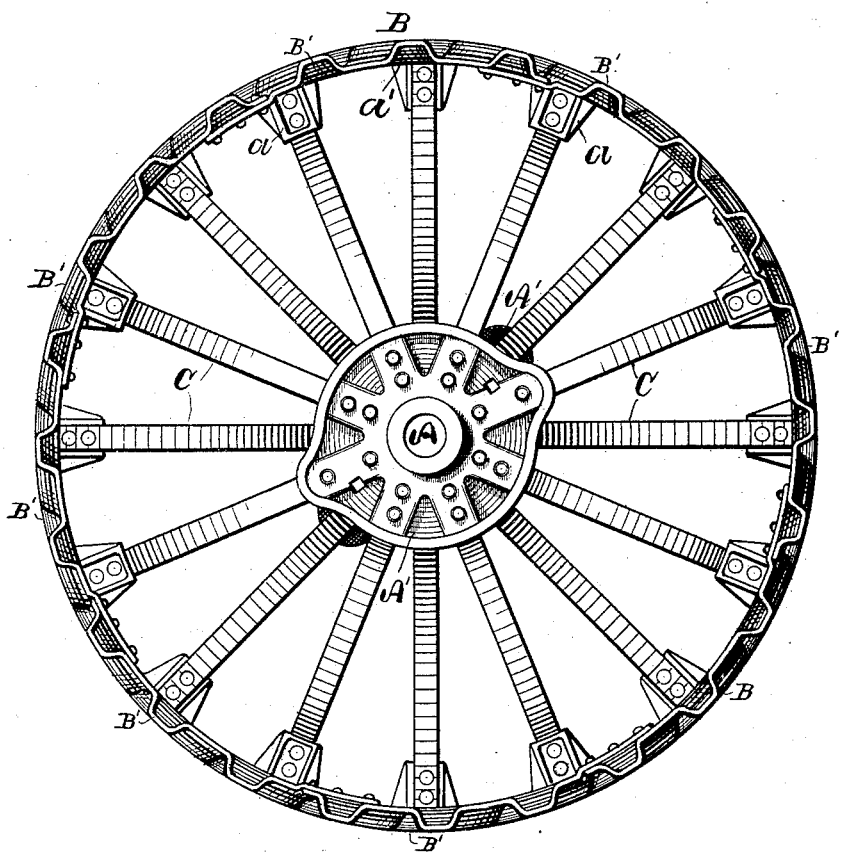
Figure 3:
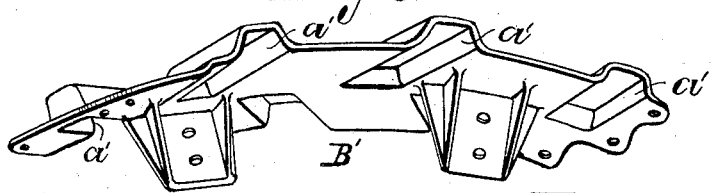

In the accompanying drawings, Figure 1 is an elevation view of a traction-wheel embodying our invention. Fig. 2 is a top or plan view of the same. Fig. 3 is a perspective view of one of the sections in detail.

Like parts are indicated by similar letters of reference throughout the several views.

In the said drawings, A represents the hub or spider, B the rim or tire, and C the spokes. The hub is preferably cast with a flange, A', on either side thereof, the said flanges being provided with depressions or sockets adapted to receive the inner ends of the spokes C. The spokes are preferably made of flat wrought-iron, and are riveted at their inner ends to the flanges A'. The rim or tire B is made of sections B', each of which is preferably cast of malleable iron and provided on the under side with lugs or ears $a$, adapted to receive the outer ends of the spokes C. The sections B' are each preferably cast from the same pattern, and are so constructed that the end of one section is adapted to overlap the opposite end of the next section. The said sections are each constructed with a series of indentations or pockets, $a'$, which project from the outer surface or periphery of the wheel and form a series of cleats or projections thereon. These cleats are preferably arranged in alternating series on opposite sides of the wheel, and at an angle across the face thereof, as shown in Fig. 2. The sections are preferably secured together by riveting through the overlapping ends, after which the outer ends of the spokes are riveted to the ears $a$. By this construction it will be seen an exceedingly strong and light wheel is secured. The tire, being made in sections, can be made of any desired width with very little additional expense or trouble. By having the cleats formed in the nature of indentations or pockets on the under side of the sections the same thickness of metal is secured throughout the length and breadth of the tire. The cleats being arranged in alternate series on the opposite sides of the face thereof, the inner ends of the pockets act in the nature of ribs to strengthen the tire, while the construction is at the same time very light.

Having thus described our invention, we claim—

1. In a traction-wheel provided with cleats or projections on the periphery thereof, a tire or rim formed of sections joined at their respective ends, said tire or rim being formed of a uniform thickness by having the cleats constructed integral therewith and hollowed or cored out on their under side, substantially as set forth.

2. The combination, with the hub provided with flanges on either side thereof, of a sectional rim having ears or lugs integral therewith, and spokes riveted at either end to said ears and flanges respectively, substantially as set forth.

3. The combination, with a central hub having flanges on either side thereof, of a rim or tire composed of sections having overlapping ends riveted together, each of said sections being provided with a series of indentations or pockets adapted to form cleats or projections on the outer surface thereof, and having ears or lugs on the inner side adapted to be connected to the spokes, substantially as specified.

4. In a traction-wheel, a rim or tire composed of sections, said sections being provided with lugs integral therewith, to which the spokes of the wheel are adapted to be secured, substantially as set forth.

In testimony whereof we have hereunto set our hands this 28th day of August, A. D. 1885.

OLIVER W. KELLY.
LOUIS F. DIETER.

Witnesses:
PAUL A. STALEY,
CHASE STEWART.